United States Patent

Satyanarayana

[19]

[11] Patent Number: 5,898,733
[45] Date of Patent: *Apr. 27, 1999

[54] PACKET HOPPING SYSTEM WITH SLIDING FREQUENCY, AND TRANSCIEVER FOR THE SYSTEM

[75] Inventor: Srinagesh Satyanarayana, Tarrytown, N.Y.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/498,286

[22] Filed: Jun. 30, 1995

[51] Int. Cl.$^6$ .................................................. H04B 1/713
[52] U.S. Cl. ......................... 375/202; 375/204; 375/272
[58] Field of Search ...................... 375/202, 204, 375/272, 275, 303, 334, 335, 200, 367; 370/349

[56] References Cited

U.S. PATENT DOCUMENTS

| | | | |
|---|---|---|---|
| 5,090,024 | 2/1992 | Vander et al. ............................. | 375/1 |
| 5,263,046 | 11/1993 | Vander ....................................... | 375/1 |
| 5,278,682 | 1/1994 | Niki ............................................ | 359/62 |
| 5,307,372 | 4/1994 | Sawyer et al. ........................... | 375/202 |
| 5,359,625 | 10/1994 | Vander et al. ............................. | 375/1 |
| 5,432,814 | 7/1995 | Hasegawa ................................. | 375/202 |
| 5,442,660 | 8/1995 | Kuo et al. ................................. | 375/202 |
| 5,548,582 | 8/1996 | Brajal et al. ............................. | 375/202 |
| 5,583,866 | 12/1996 | Vook et al. ............................... | 375/202 |
| 5,668,803 | 9/1997 | Tymes et al. ............................ | 375/200 |

FOREIGN PATENT DOCUMENTS

0619663a2  10/1994  European Pat. Off. .
2193614    2/1988   United Kingdom .

OTHER PUBLICATIONS

V.R. Hohman, 900–MZ Radio Provides Two–Way Path Control & Return, Transmission & Distribution (Jun. 1984) pp. 33–36.

G.W. Kelly, "Sona/ECS a Decentralized Environmental Control System", Proc. IEEE Comp. Soc. Workshop on Computing Aid to the Handicapped, Nov. 4–5, 1982, p. 103.

Primary Examiner—Don N. Vo
Attorney, Agent, or Firm—Anne E. Barschall

[57] ABSTRACT

Packets of data are transmitted over a distributed communications network formed by a number of transceivers. To minimize interference by other signals, the carrier frequency of each transmission is varied compared with the last transmission by that transceiver, for example by using a linearly sliding carrier frequency which varies continuously during periods of inactivity and while transmitting. The receivers scan the band at a rate sufficient to detect a preamble carrier burst preceding each data packet. The transceivers operate asynchronously with low data rate FSK signals, using carrier frequencies between 900 and 950 MHz.

14 Claims, 8 Drawing Sheets

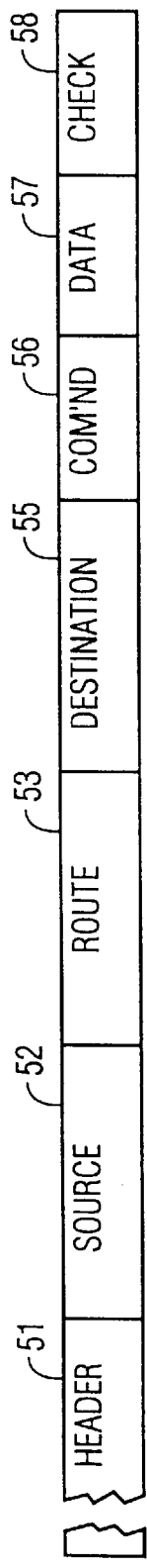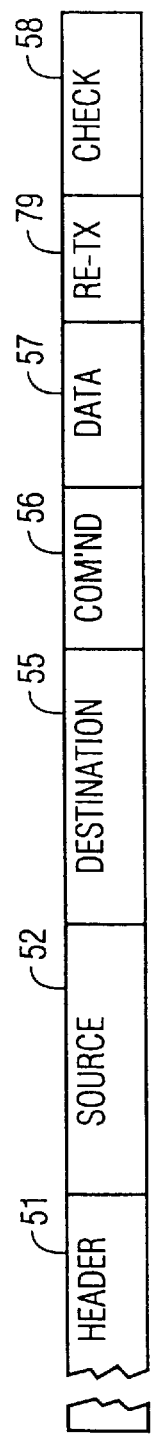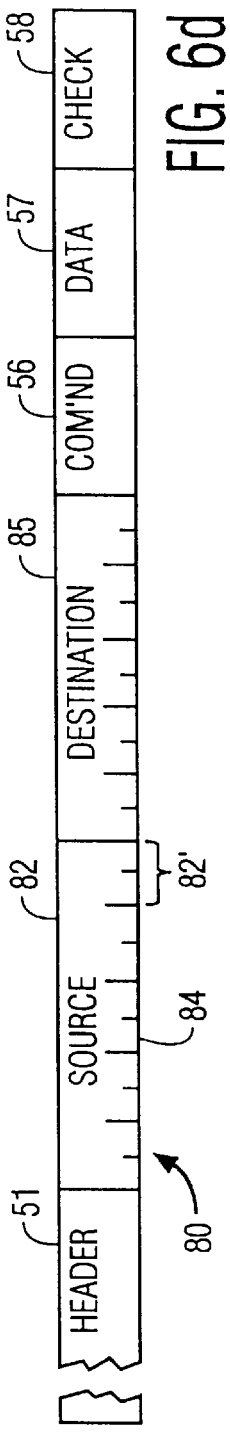

PACKET HOPPING SYSTEM WITH SLIDING FREQUENCY, AND TRANSCIEVER FOR THE SYSTEM

CROSS-REFERENCE TO RELATED APPLICATIONS

This application is related to concurrently filed application, Ser. No. 08/498,715 by Thomas E. Jednacz, Yongping Xia and Srinagesh Satyanarayana for LIGHTING CONTROL SYSTEM WITH PACKET HOPPING COMMUNICATION which is now U.S. Pat. No. 5,726,644, and concurrently filed application, Ser. No. 08/498,285 by Srinagesh Satyanarayana for TRANSMITTER CONTROL SYSTEM FOR LOW DATA RATE FSK MODULATION.

BACKGROUND OF THE INVENTION

1. Field of the Invention

The invention relates to distributed communications systems, in which relatively short packets of data are transmitted by radio transmissions of very low power, and relatively long periods of time pass between transmissions. Such a communications system is proposed for use in a centralized system for controlling devices located in many places throughout the building. For example, the invention is applicable to centralized control of artificial lighting systems in buildings where each room or area has an individual local control, or to heating and/or air conditioning systems having many individually controllable heating devices, heat pumps (heating or cooling) or heat exchangers; to occupancy-sensing, security, or fire detection systems requiring sensed-data transmission from a multiplicity of sensor locations to a central location, as well as control signals transmitted back to selected locations.

For convenience, this specification refers extensively to a "building" or "building computer." It should be clear that the term "building" should be interpreted as including a portion of a building, or a building complex having two or more structures or portions thereof under common control, and sharing one network; and might be applicable to an amusement park or other outdoor situation.

Other applications not directed at energy conservation might include centralized override of volume or channel settings for an existing hard-wired background music and public address system, and in particular would allow control on a group or zone basis where this had not been provided in the hard-wiring layout.

2. Description of the Prior Art

The need to provide low data rate transmission to large numbers of locations has usually been met by hard-wired systems, because of the value of channels in the radio spectrum. For example, central building control of lighting or ventilating and air conditioning units has been possible for many years, through use of low voltage wiring from a central office or computer to operate relays controlling local power circuits. Such a system is very difficult to retrofit in an existing building. A further difficulty with this type of system is that correction of wiring failures is often difficult because wiring drawings are inaccurate or non-existent, and tracing these low voltage cables is time consuming and expensive.

A low-power radio control system for receivers up to 75 feet away is described in a paper "SONA/ECS, a decentralized environmental control system (for disabled)" published as part of the Proceeding of the IEEE computer Society Workshop on Computing to Aid the Handicapped, Nov. 4–5, 1982.

Another system for building control makes use of the existing AC power wiring in the building to carry control signals. So-called "carrier current" systems for impressing a relatively low radio frequency on AC power wiring have been used for telemetering data in power distribution systems, and for "wireless" intercom or music systems, but have been prone to excessive noise. To reduce cost, 900 MHz radio channels for 2-way communication are described in "900 MHz radio provides two-way path for control and return" is described in Transm. and Distribution, vol. 36, no. 6, pp 33–6 for June 1984. This system had the advantage that it was claimed to be installable and maintainable by the utility's own workforce.

To avoid unreliability due to interfering signals from other users of frequency bands in which unlicensed operation is permitted, systems using high frequency spread spectrum techniques for distributing control signals are described in U.S. Pat. Nos. 5,090,024, 5,263,046, 5,278,862 and 5,359,625. The last of these approximates a swept frequency waveform in which successive square waves are formed by the chirps of the sequence, and the frequency of the square waves is varied over at least a portion of the sequence. This technique is suggested for use in the 900+MHz band.

A control system sold under the name Echelon uses microprocessors for control of direct link communication to each of the individual controls of the network over a common channel. This system caters to a wide variety of applications,, and can have as much as a 1 Mbit/sec communication capacity. This system uses a communication protocol which specifies a packet structure, handshake commands to set up a communication and acknowledge a communication, certain error correction and recovery, and retransmission after a time delay if a communication is lost. Transmission is possible over various media, such as twisted pair, radiated RF, infrared, or high frequency signals carried on the power line, between the central source and each of the nodes, except where a relay may be provided to a group of nodes. As a result, installation of such a system is expensive and requires considerable development time. The Echelon system can be used in the license-free 49 MHz band when power is less than 1 watt. Especially if an RF signal is transmitted over the power lines, this system employs a spread spectrum encoding to provide noise immunity.

SUMMARY OF THE INVENTION

An object of the invention is to provide radio transmission of data packets which is relatively unaffected by interference from other users of the same frequency band.

Another object of the invention is to provide a distributed communication system using low cost transceivers.

Yet another object of the invention is to provide such a system which does not require temperature stabilized transceivers.

According to the invention, transceivers for digital data transmit signals use a carrier frequency which is very high compared with the data rate, so that the signal has a narrow relative bandwidth. The carrier frequency is varied slowly over a range, or given band, which is wide compared with the bandwidth. Individual packets of data are transmitted with a sufficient time delay between the successive transmissions of a particular packets so that the carrier frequency has changed by an amount greater than the signal bandwidth.

Transmission may be at a randomly selected ones of a group of frequencies within the band. Preferably, however, the carrier frequency is varied continuously over the band or portions of the band.

In the preferred embodiment, the transmission frequency is controlled to vary linearly with time, in a sawtooth or, still more preferably, a triangular waveform pattern.

In another preferred embodiment, the carrier frequency varies continuously, including the time period during which a data packet is being transmitted.

In yet another preferred embodiment, a voltage controlled oscillator (VCO) oscillates continuously, and the unmodulated carrier frequency varies linearly with time. A power amplifier between the oscillator and the antenna is switched on and off to control transmission.

Preferably, when messages (a packet) are successfully received by the addressee an acknowledgement signal is sent. The originating station or transceiver waits a predetermined period of time, to determine if the acknowledgement has been received. If this does not occur, the packet is resent. Because the second sending is at a different carrier frequency, the probability that the message will not be received, because of interference from some other radio signal, is greatly reduced.

In a preferred embodiment, the individual transceivers are part of a distributed communication system in which a packet may require a number of hops (retransmission by intermediately located transceivers) to reach the addressee. The probability that one of the transmissions will be unsuccessful is then increased. In this embodiment, where each transceiver uses the technique of changing frequency between successive transmissions, and does so independently and asynchronously of other transceivers in the system, the probability of intrasystem collisions at a receiver is also reduced.

In another embodiment, before resending a transmission an originating transceiver preferably waits a period of time which is based on the anticipated number of hops required to reach the addressee and return. In any event, the frequency at which the pack is resent is independent of the frequency used for the first transmission.

In a distributed communication system according to the invention, each transceiver is a low power radio transceiver which transmits sufficient power to communicate with at least one other of the transceivers, but not all of them.

According to another preferred embodiment of the invention each transmission is a packet of digital information preceded by a burst of unmodulated carrier signal, and/or a synchronizing signal. This preamble has a duration dependent on the scanning rate of the receivers, so that receivers can lock on to a transmission before the first data bit is received.

Preferably each transceiver includes a microprocessor for determining, from information in a packet received by that transceiver, whether the packet is intended for that transceiver; and if not, whether or not the packet should be retransmitted.

In such a system it is preferred that most or all the transceivers are interchangeable and transmit with approximately the same power level in a frequency band which provides good penetration of structural walls and floors, but without radiating substantially into other buildings or communication regions. The frequency band can be any available commercial transmission band which has suitable propagation characteristics. However, it is also advantageous to select a band, such as an "ISM" band, which permits unlicensed operation if the power output is less than a certain figure, such as one watt. A desirable band meeting those qualifications, and for which relatively low cost RF equipment is readily available, is the 900 to 950 MHz band; but other bands such as ISM bands near 49 MHz, 470 MHz, and 2.4 and 4.5 GHZ may be considered.

In yet another preferred embodiment, upon receiving a packet which it should retransmit, a transceiver will wait for a period of time and will then retransmit, unless the transceiver detects presence of a carrier signal, at a frequency which is related to the duration of the period of time since the last transmission by this transceiver. This period of time is preferably obtained from a random number table stored or generated in the transceiver/control unit combination; but the delay may a selected value pre-assigned to that combination.

In another embodiment, to reduce cost the transmitter frequency is not highly stabilized, especially with respect to temperature. Transmission frequency will thus vary somewhat according to temperature or aging effects, as well as the intentional varying from one transmission to the next. In this embodiment the receiver section is capable of detecting transmission at any frequency within that relatively broad band, and locking on to that frequency to detect the digital signal. Preferably, all the transceivers are interchangeable and transmit with approximately the same power level, using a carrier frequency which is between 900 and 950 MHz; and still more preferably, within a nominal band approximately 10 MHz wide, such as approximately 905 to 915 MHz.

BRIEF DESCRIPTION OF THE DRAWING

FIGS. 6a–6d are diagrams of packets usable with different operational protocols, the packet of FIG. 6c being adapted for the system of FIG. 5.

DESCRIPTION OF THE PREFERRED EMBODIMENTS

Figure 1:
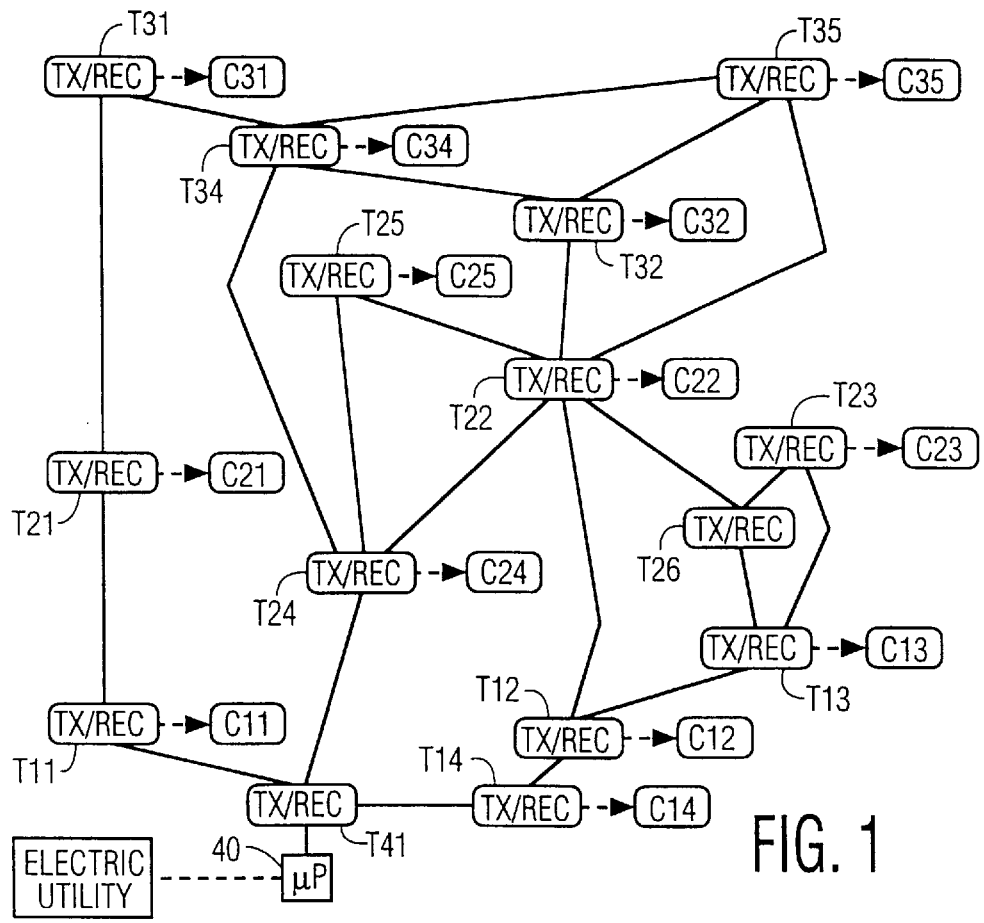
FIG. 1 is a schematic drawing of a system according to the invention, showing communication links which are expected to be functional between different nodes.
Figure 2:
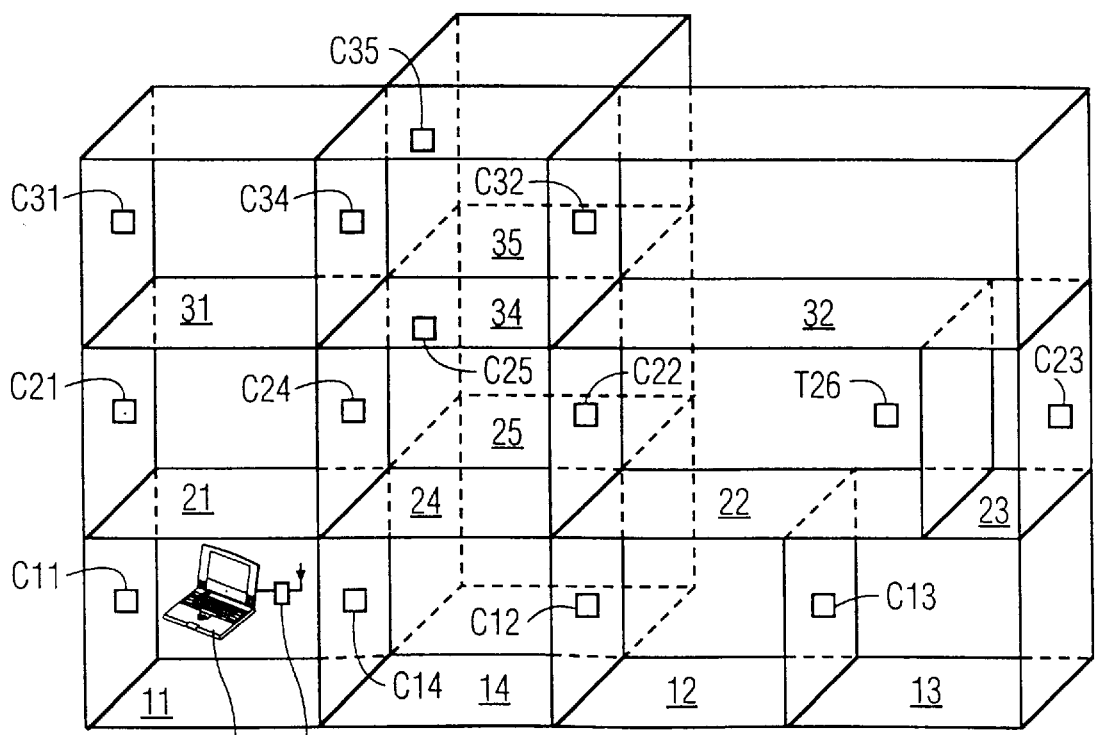
FIG. 2 is a diagrammatic view of a building in which the system of FIG. 1 is used.

The system shown in FIG. 1 demonstrates the principle of the invention as it might be applied to a building shown diagrammatically in FIG. 2, having rooms 11–14, 21–25, and 31, 32, 34 and 35. A number of RF transceivers T11–T14, T21–T26, T31, T32, T34, T35 and T41 form a communications network. All but two of these transceivers have respective associated room lighting controls C11–C14, etc. which control the built-in fluorescent lighting in the respective rooms, and which receive control signals from the transceiver. The transceiver T26 functions as a radio relay and therefore does not have an associated lighting control. The system includes a building computer 40 directly connected to the transceiver 41 which can communicate with the transceiver/control combination T11/C11 for the lights in that room, and preferably at least one or two other transceivers of the network. It will be clear, of course, that the building computer and its associated transceiver do not need to be in the same room (they are usually connected by a cable), and the transceiver T41 can be located anywhere so long as it can reach and be reached by at least one other transceiver.

Almost any small computer will have sufficient processing power and storage capacity for use with the invention. An "application" program will provide procedures for network set-up, normal operation (both automatic and as instructed by building personnel), routine network testing, and any desired interface with other computers or sources of control.

Figure 3:
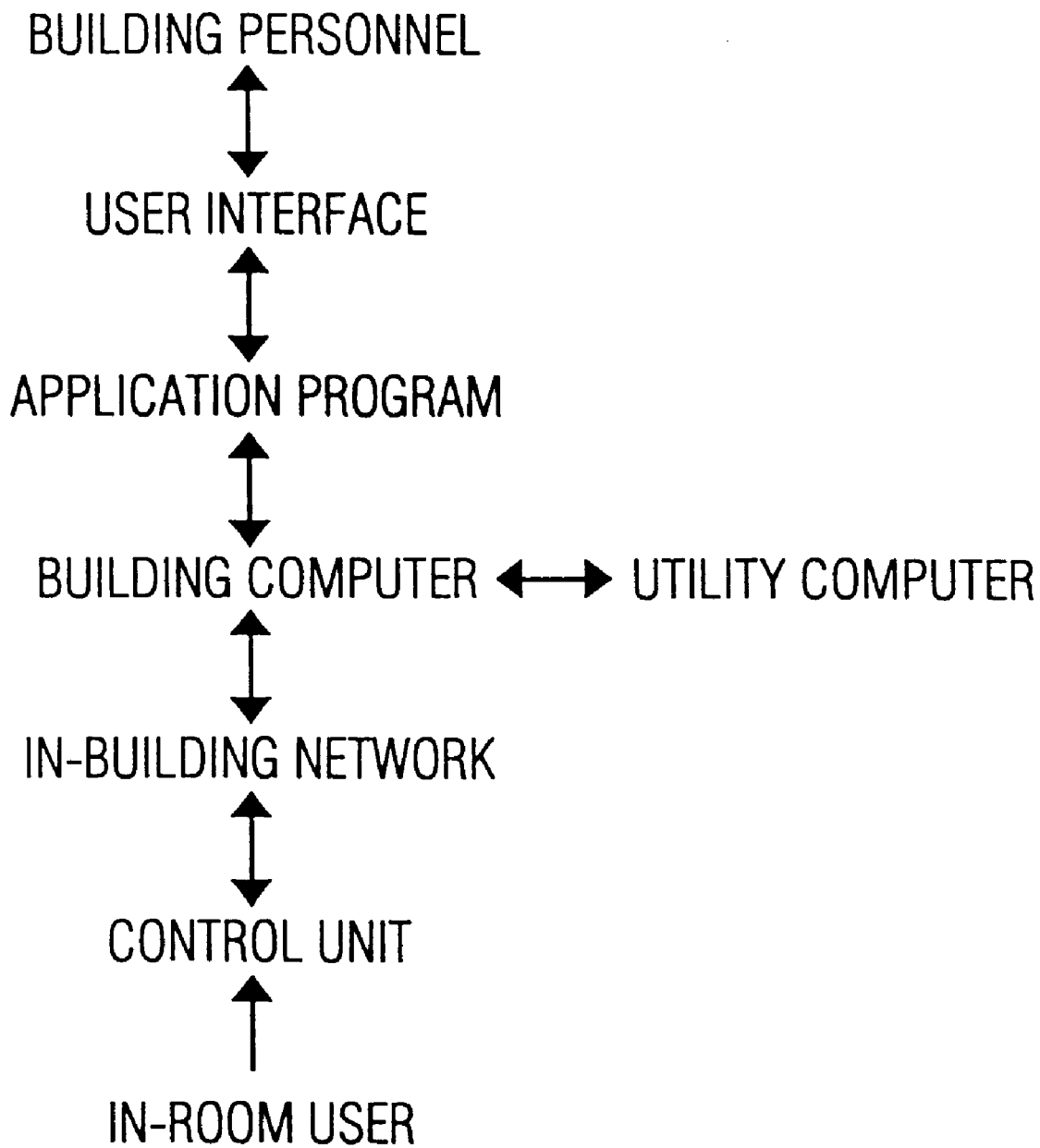
FIG. 3 is a diagram showing the relationship between different levels of control of building lighting.

The different levels of control made possible by the building communication system are shown in FIG. 3. The highest level uses applications programs in computers; these may also be considered as intelligent software modules which reside primarily in a building computer, but may also automatically interact with another computer in, for example, an electric utility serving the building. The second level of control is the building manager, who will have at least some power to modify or override the normal control modes of the building computer. The third level is the communications network itself, because partial failure of, or changes in, this network affect the ability of the higher levels to control room units. The lowest level is user control, which can range from an indefensible on-off switch (ultimate authority) to a limited permitted variation in the dimming setting of some or all of the luminaries in a room.

To permit use of standard "building blocks" for assembling systems, and avoid the administrative complications of facility licensing, it is preferable to select a transmitter power and carrier frequency for which unlicensed operation is permitted, but which can transmit through at least one interior wall or floor of a building so as to provide reliable communication with at least one other transceiver. It is also desirable to minimize interference (false reception of lighting control signals) by a similar system in adjoining building. In a preferred embodiment of the invention, each of these transceivers operates in the same frequency band, such as the UHF band between 900 and 950 MHz, and preferably the band between approximately 905 and 915 MHz, where pulsed transmission below 1 watt power is permitted. In a building of typical commercial office construction, power levels between 30 and 100 mw, for example, appear desirable. By limiting the duration of each transmission burst to, for example, 100 msec, and observing a waiting interval slightly over 6 seconds, the average transmitted power can be maintained below the equivalent of 460 $\mu$w continuous. The paths of reliable communication between transceivers T11–T41 are shown by the interconnection lines in FIG. 1.

To minimize the effect of failure of any one transceiver, the network layout in the building has been designed to provide at least two normally reliable communication links for each room transceiver/control combination. Typical intra-building problems whose resolution is shown by this embodiment include the lobby 14 on the ground floor, which may have special ceiling decorations or features interfering with communication with the room 24 directly above, and the end room 23 which does; not have reliable communication directly with combination T22/C22 because of the length and utilization of room 22. This problem is overcome by providing transceiver T26 partway along the length of room 22 to relay messages.

In the system shown, signals normally originate from the building computer 40. This computer will frequently itself be connected via a modem or other network to a power company (electric utility) computer, to provide automatic control in the even of emergency conditions requiring reduction of power consumption in a region. The transceiver T41 transmits signals which are coded either to control a designated one or group of the wall units C11–C35, or all the units.

Another aspect of the invention relates to the control of retransmission by the various transceivers, so that messages will eventually reach their destination, and an effective compromise can be reached between overall system control complexity and confusion due to multiple transmissions of the same message.

Stored Routing Tables

Figure 5:
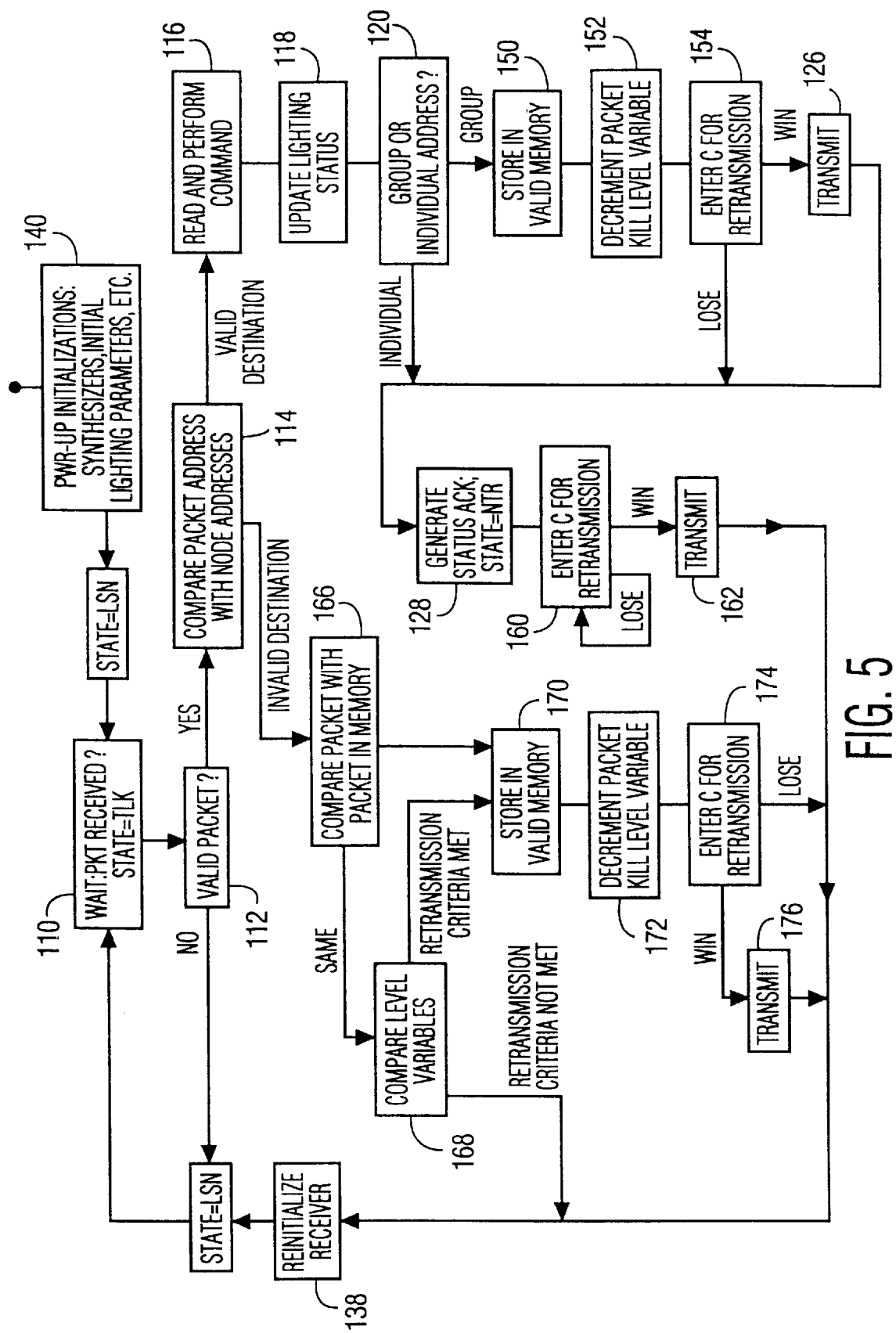
FIG. 5 is a node logic diagram for the system of FIG. 1 communicating by pseudo-random flooding.

The operational scheme shown in FIG. 5 uses a predetermined routing arrangement, with each node operating asynchronously, and retransmitting on a CSMA (Carrier Sense Multiple Access) basis. Each transceiver contains an address table of those nodes (or groups of nodes) for which messages are to be routed through this node. When a message is received at step 110, it is error checked in step 112, and in step 114 the destination address in the packet header is compared to determine if it is directed to this node. If so, in step 116 the control message is decoded and performed, and in step 118 any directed immediate change in lighting is checked.

In step 120 the destination address is again checked, to determine if other nodes should receive the same message. If not, then an acknowledgement control signal is output. If this is a group address, then in step 122 the address table is checked to determine if the message should be retransmitted. If YES, then in step 124 the channel is checked for signals indicating that another transceiver is transmitting, and in step 126 the message is retransmitted as soon as the channel is clear. If the step 120 determination was that the address was an individual address, or in step 122 the group address was determined not to be in the address table (that is, this node is not in the pre-set path to any more remote nodes), or the step 126 transmission has been completed, then in step 128 an acknowledgement signal is generated.

If, contrary to the sequence described above, in step 114 the received packet address is determined not to be this node, then in step 130 the address table is checked to determine if this packet address is listed. If this answer is YES, or step 128 has been completed for a message intended for this node, then steps 134–136 are performed similarly to steps 124–126, thereby transmitting either the message intended for the other node, or the acknowledgment of receipt by this node. After the step 136 transmission, or determination in step 130 that the message is not intended for a more remote node on this pre-set path, then in step 138 the receiver is re-initialized to await any other messages.

Figure 4:
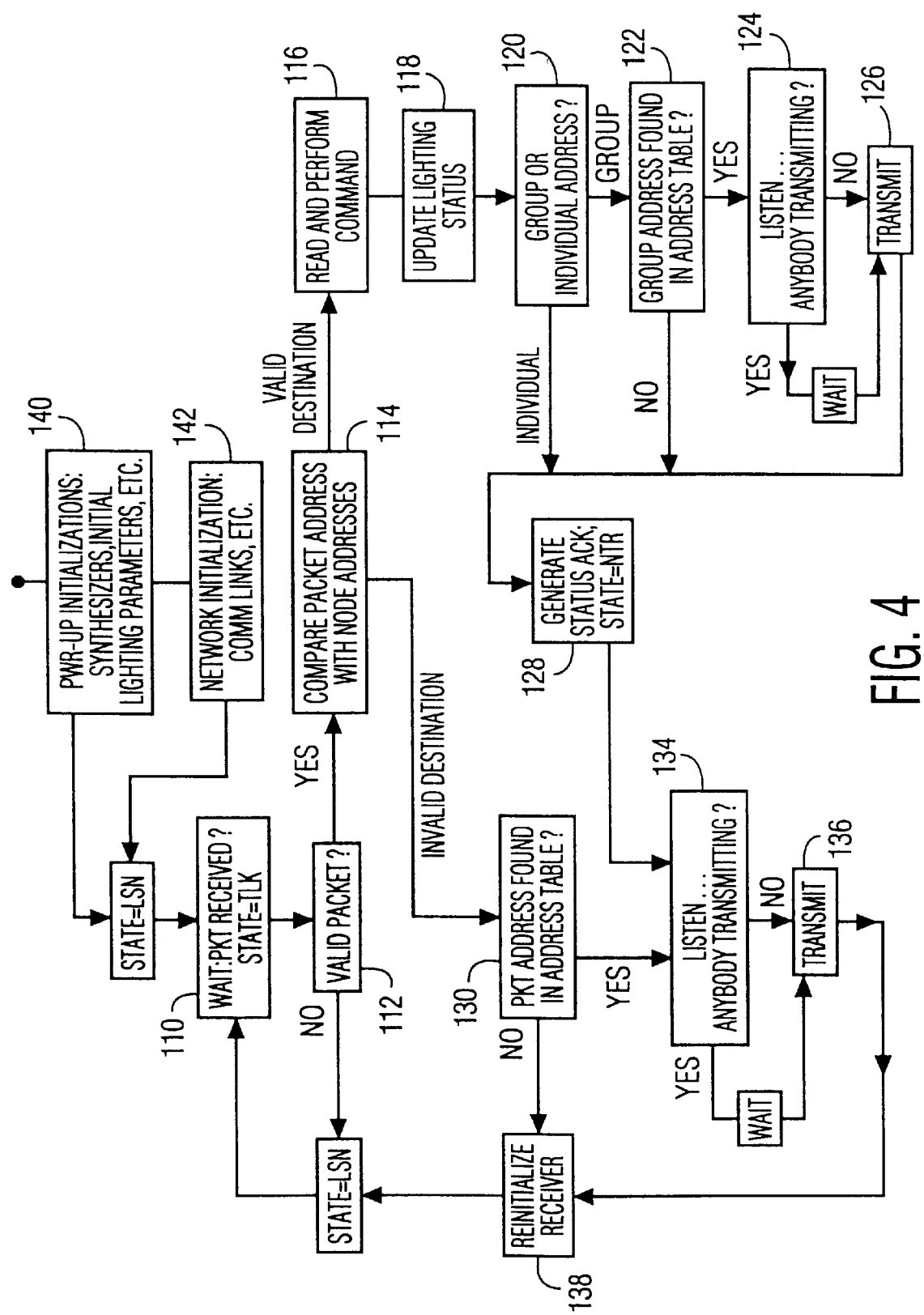
FIG. 4 is a node logic diagram for the system of FIG. 1 communicating over partially pre-planned routing.

The process of FIG. 4 presumes not only that each transceiver or transceiver/control combination has (typically, has been programmed with) a unique node address, but also that address tables for group addresses and node addresses have been provided and loaded. The pre-set routings represented by these address tables can be predetermined from a study of the building layout, but are subject to required modification in the event of failure of a transceiver near the beginning of a path, or degraded or blocked transmission between two transceivers which are adjacent on the path. Thus, in addition to power-up initialization in step 140, and network initialization in step 142, discussed below, automatic reconfiguration of the pre-set routing may be required if repeated failure of the building computer to receive acknowledgement signals from one or more transceivers indicates either a hardware failure or a communication link blockage.

As described above, the FIG. 4 configuration and operating method may increase both costs of hardware and network overhead for initial programming and re-programming within the building computer and at the affected transceivers. In a building having a number of communication links whose reliability changes frequently because of building use dynamics this re-programming could be a serious disadvantage. This can be overcome by providing two or more routing paths to particular combinations, for example by including additional addresses in the tables searched in step 130.

Flooding

An alternative communication method involves "flooding" the building, such that each transceiver repeats received messages without consideration of logical or pre-set routing, unless a received message is addressed solely to that node. However, it is clear that there must be some limitation, or else a message would be endlessly circulated around the network. One form of limitation is to put a date/time cut-off code in the header when it is transmitted from the building computer, and to inhibit re-transmission by any node after that time, and to put a similar cut-off code in the header of acknowledgement messages. However, this method requires that each transceiver/control combination contain a local clock whose time is accurate, at least in comparison with the time for a packet to be retransmitted to its final destination.

Another method of limiting message circulation around the network involves inserting a sequence number in the header, and providing each transceiver with a memory stack which has a preset number of locations for storing the most recently received sequence numbers, and re-transmits a message only if its sequence number is not found in the stack. Again, however, this method requires additional memory capacity in the transceiver/control combination.

Flooding with Hop Counts

A method of limiting message circulation, without requiring large local memory capacity, utilizes a kill level variable code placed in the header of each transmitted packet. This technique takes advantage of the fact that the building computer contains data defining the number of relay steps normally required to reach each node in the building, so that it is easy to limit the number of re-transmissions to zero for nodes in direct communication with the building computer's transceiver; to one, for "second tier" nodes, and so on; and to allow one or two extra retransmissions for far-removed nodes where collisions on the most direct route may cause a message to arrive by a slightly longer route. This method also prevents a given node from retransmitting a second time, when it receives a retransmission of a packet from another node after the given node has retransmitted the packet.

The logic diagram of FIG. 5 shows operation of a node when the transmission protocol includes a packet kill level variable. Steps 110–120 are the same as in FIG. 4. After determination in step 120 that the address was a group address, however, in step 150 the packet is stored in a packet memory. This packet header includes a field containing a kill level variable, which is a number that indicates how many times this message may be re-transmitted. In step 151 this field is checked, and if the value is greater than zero, in step 152 the kill level variable is decremented once. In step 154 this modified packet is held while the channel is checked, as in step 124 of FIG. 4.

If the channel is clear, then in step 126 the packet with decremented kill level variable is transmitted. After a predetermined period of time in step 154, if the channel has not become clear the attempt to retransmit is aborted. Following aborting in step 126, or identification of an individual address in step 120, an acknowledgement packet is generated in step 128. Even though aborting means that nodes farther down the group will not receive the packet at this time, if this node waits too long to transmit the acknowledgement signal, then the building computer will repeat the packet to this node as well as others.

In step 160 the acknowledgement packet is held while the channel is checked, as in step 134, and in step 162 the acknowledgement signal is transmitted.

If in step 114 a received packet is determined to be addressed to a different node, then in step 166 it is compared the previously received packet which is most recently stored in the packet memory. This memory may be sized to store only the most recently received packet or, where traffic is high in a large network, the last two or more may be stored for comparison. If the address and data content are the same, then in step 168 the packet kill level variable in the memory is compared with that of the packet just received. If the variable in the just-received packet is the same as or less than the stored value of the variable, and is greater than zero (that is, the just-received packet has arrived here by the same number as, or fewer retransmissions than, the one previously received, so a new repeat packet will be forwarded), or if the comparison in step 166 showed that this message is a different message, then in step 170 this packet is stored in the same memory as used in step 150. In steps 172, 174 and 176 the packet kill level variable is decremented, the resulting packet is put in the one-step queue for transmission if the channel becomes available soon enough, and is transmitted as in steps 152, 154 and 156. After transmission of acknowledgement in step 162 or the other node's packet in step 176, or loss of transmission criteria in step 168 or 174, in step 138 the receiver is re-initialized to await receipt of the next packet.

The node processing of FIG. 5 prevents retransmission of a recently retransmitted packet upon receipt of that same packet as a result of retransmission by a node further removed from the building computer, while at the same time accepting for retransmission a repeat message from the building computer, resulting from failure to receive an acknowledgement signal after a previous attempt to send this packet to another node.

Acknowledgement packets may be handled just like outgoing packets, except that they always will be directed to the building computer. Therefore, instead of providing that address, an acknowledgement code may be used. The combination (which was the destination for the packet originally) can then leave its address in the same location in the packet, and set the kill level variable to a predetermined value stored in that combination's memory.

Partitioned Spanning Tree (PAST)

For a building which is not large, and in which the necessary communication links are reliable, an efficient (in terms of communication resources) routing protocol uses partitioned addresses, which combine a unique address and routing information in one field in the packet. Although the packet length may be increased, for a network where the longest chain is 10 or fewer links, this packet length is acceptable.

The packet format shown in FIG. 6d uses two bit positions to represent one four-level digit of an address. If messages are limited to all-network, and individual node address, then theoretically 255 rooms can be addressed with a 4-digit address using four-level digits, but in practice the realizable number will be much less.

Preferably, at each node few, simple comparisons should be required to determine if a message is to be retransmitted. The PAST format shown uses one digit to identify the first level nodes (e.g., 1000); the next digit to identify nodes reached through that first level node (1200 is the second node reachable through node 1000); and so on. An address of 0000 is recognized as an "all-network" message and is retransmitted by all but the last-level nodes.

According to this protocol, at first level node 1000 any address having the first digit=1, and at least one other digit unequal to 0, should be retransmitted. Second level node 1200 will retransmit addresses starting with 12, and having either later digit unequal to zero; and so on. This routing scheme greatly simplifies the logic and memory requirements at the various nodes; but 2-bit digits limits the tree to 3 nodes at each level of branching, except for the last level which can accommodate 4 nodes for each of the 9 third level nodes. Thus, if the farthest rooms can be reached in 4 hops, and the starting point is near the center, a total of 147 rooms could theoretically be addressed uniquely. However, it is unlikely that signal propagation in a building will be that favorable, so that many of the addresses would be unusable.

In the system just described, an address of 0000 is a network-wide broadcast. However, no use is made of addresses 0001 through 0333. A more efficient operation can use a leading bit to distinguish between a network-wide broadcast and an acknowledgement signal. With this addressing scheme, more of the following bits are available for addresses; if "1" means acknowledgement, then the following bits will be used for the address of the node. This arrangement enables a node receiving such an acknowledgement packet to retransmit only if it comes from a node farther out on the same branch of the tree, and thereby inhibit multiple retransmissions of the same acknowledgement signal by different nodes at the same level.

One problem which is not readily overcome is that of collisions between acknowledgement signals following a network-wide broadcast. In particular, all nodes have identical transceivers and microprocessor capabilities. None of these include storage of packets in a queue for retransmission. Therefore, if two nodes transmit, in rapid but non-colliding succession to the same higher level (closer to the building computer) node in the tree, it is likely that the higher level node will not yet have retransmitted the first of these acknowledgement packets, and one will become lost. This cannot be resolved easily by setting staggered delays in transmission of acknowledgement of a network-wide broadcast, where these delays are simply related to the node address, because certain nodes will receive strong signals from nodes which are in other branches, and are capable of preventing accurate detection of signals from nodes in the same branch.

Increasing the length of the address, by increasing the number of levels or increasing the number of bits per digit, allows use of this scheme for buildings with a large number of rooms. However, in the event that one of the communication links becomes unreliable, reconfiguration of the routing can be very difficult.

Signal and Data Format

For reasons to be discussed below, the carrier frequency is very high compared to the relatively small amounts of data required for building control. A very low data rate such as 4800 baud will suffice. One proposed format and transmission plan involves a transmission cycle of approximately 200 msec; that is, the building computer will wait that long to receive an acknowledgement signal. Failure to receive acknowledgement within that time period is considered proof of failure, so that the message will be resent.

Alternatively, when the farthest nodes will require many hops to be reached, the building computer may base the time before re-sending of a message on the number of hops required for the round trip, plus allowance for some waiting time before each of the re-transmissions.

A packet may consist of 20 8-bit bytes transmitted at a 20 Kbit/sec bit rate, preceded by an unmodulated carrier burst or preamble lasting perhaps 12 msec. This corresponds to a total transmission duration of 20 msec. At least the first two bytes will be allocated to address and/or other data, including routing information, which will identify a single room control, or a group, or all controls, to which the message is directed. Only 3 bits are required for lighting brightness (dimming) information. Additional bits will be allocated for check bits, and acknowledgement or other system command information.

The different packet formats shown in FIGS. 6a–6d are not drawn to accurate time scale. The length of one block is not necessarily one byte, or an integral fraction of or number of bytes. Blocks which, for a given size building and control arrangements, may be identical, have the same reference numeral.

Direct Routing

Perhaps the least sophisticated technique, because it increases packet length the most, is to transmit a complete routing path as part of each outgoing packet. This has the advantage of simplicity in processing at each node; however, in a medium large building having unique addresses for each node, eight to twelve bytes may easily be required.

As shown in FIG. 6a, a packet 50 starts with a header or preamble 51, which may be unmodulated or contain synchronization or other bit modulation to simplify identification of the packet as valid for this network. The header or preamble will have a length determined by the relative difficulty (amount of time required) for a receiver to lock on to the transmission, for decoding and acting on it. The first information block 52 is the address of the node or transceiver which originated the packet; for outgoing packets this would be the address of the transceiver T41 connected to the building computer. The next block is the route block 53, which contains information describing the route to be followed between the source and the destination. The route block 53 may be as short as one address, as shown, when the destination is a second-tier transceiver; many bytes in length if the destination can be reached only after many retransmissions; and will be omitted if the destination is a first-tier transceiver; or may be coded in some fashion to reduce packet length in a large building.

In the format of FIG. 6a the fourth block is the destination block 55, which is the address of the combination for which the packet's control data is intended. The address can be completely arbitrary, or can contain portions identifying the building (useful if adjacent building interference is a recognized problem) as well as addresses within groups. This is followed by a command block 56, which may contain various kinds of network information or packet description, such as "acknowledgement," or the packet length, or priority information; or may designate that some special response is required of the combination, such as transmitting a test signal. The data block 57 may be very short. In a lighting control network, settings of "off," or dimming to 9%, 25%, 50%, 90%, normal, or 110% may be used, as an example. This can be coded in only three bits.

The check block 58 is the last transmitted in most formats. This may follow any desired error checking or correction routine, and may be more or less than one byte in length.

When the FIG. 6a format is used, the entire route information may be preserved when the packet is retransmitted, or the address of the node doing the retransmitting may be deleted from the list. When the full route is retained to the destination, then the generation of the acknowledgement packet is simplified, because all of its route information already exists. However, this protocol requires that a receiving combination must check the entire route and destination blocks to determine if the packet should be retransmitted, decoded for controlling this control unit, or ignored. If any of the addresses, except the destination, does match that of the receiving combination, then the packet should be retransmitted. When writing the application program, those of ordinary skill will be able to devise other protocols based on use of this packet format, to best fit local needs.

Direct Addressing

Because it reduces packet length and the amount of retransmission, the node logic of FIG. 4 may appear most elegant. After the header or preamble, the ordinary data packet 60 shown in FIG. 6b need only contain the address 55 of the destination node; flags or other control codes contained in the command block 56; the lighting control data in block 57 which may require as little as 3 bits; and error check or correcting block 58. However, it is preferred that the source block 52 is retained in this embodiment. This block can, for example, be used to distinguish between outgoing and acknowledgement packets, and therefore can reduce the number of different logic operations required in the combinations.

Different packets may be of different lengths, usually because of differing lengths of the data field 67. When using the packet of FIG. 6b with the node logic of FIG. 4, to initialize the network the ROM's of each transceiver's microprocessor must be loaded with address tables. Other examples of extraordinary data include error correction algorithms, which may reside in fixed ROM when the control unit is manufactured, or may be loaded later. Thus initialization data may be much longer than routine lighting control data. The packet length may be one of the items coded in the command block 56.

Flooding with Hop Counts

Where the system designer wishes to avoid the requirements imposed by the FIG. 4 logic and FIG. 6b packet on memory and logic capacity required in each combination, due to storage of address tables and the necessity of multiple comparisons during data reception, and the network burden of up-dating these tables whenever substantial changes in signal transmission between nodes is discovered, then a packet format such as the packet 70 of FIG. 6c may be preferable. Blocks 52–58 may be identical to those of FIG. 6b. The particular feature of the FIG. 6c format is block 79, which includes the "kill level" variable. Typically this block is set when a packet is transmitted by the building computer's transceiver T41. It has a value related to the greatest number of hops that transmission along a normal, or slightly longer route, will take. This field value is decremented each time the packet is retransmitted, and is not retransmitted when the received packet has a kill level of, for example, 0. This prevents packets from being circulated endlessly around the network, without any need for complex address or routing schemes.

PaST Format

The Partitioned Spanning Tree format 80 shown in FIG. 6d provides predetermined routing with only simple storage and comparison functions in each node. The sole difference from the packet of FIG. 6b is the address formatting for the source block 82 and the destination block 85. These addresses are arranged in a tree structure, starting from the transceiver T41. The tree arrangement is based on the movement of a packet along successive links, which are the branches of the tree, outward from the transceiver T41. All first level nodes must be in direct communication with the transceiver T41.

The address is shown with respect to the source address 82. Each address is formed by a series of digits each occupying a sub-field 82' within the address field 82. In this embodiment a digit is represented by two bits 84, so that its numerical value can range from 0 to 3. Packets are retransmitted by a node if all but the last digit match this node's address, and this node is not a last level node (which never retransmits).

It will be clear that in all of the above packet descriptions, the values given are merely exemplary. The relative placement of the blocks within the packet has been selected for convenience in processing, and does not form part of the invention. The functions in the command block 56 and the check block 58 can be increased or varied, and neither of these blocks must consist of contiguous bits.

Collision Avoidance

To reduce the overhead burden of complex header and routing instructions, in a medium size office building operation according to the FIG. 5 method is preferable. The building computer will initiate transmission of a packet such as the packet 70 shown in FIG. 6c, and will then wait a predetermined period of time to receive an acknowledgement.

As shown in FIG. 1, transceivers T11, T14 and T24 can be expected to receive this packet simultaneously. As will be described in greater detail below, each transceiver/control combination includes at least one microprocessor (hereinafter referred to as "the microprocessor" even though its total functioning may be divided between two processors), which can decode the received digital information and determine what action, if any, is to be taken. If the message is to all controls, then an appropriate control signal is provided to controls C11, C14 and C24. At the same time, each of the transceivers T11, T14 and T24 will prepare to retransmit the message. The first step in retransmission is to observe a random delay interval, intended to reduce likelihood of collisions. Using a random number generator, the microprocessor of each of these three transceivers produces a delay interval number, for example between 1 and 128 periods. The duration of one delay period is arbitrarily selected, based on the transmitter power-up delay plus the detection response time for the transceivers of this system, but will usually be less than one packet period or a small number of packet periods. During the respective delay intervals, each of the three transceivers will listen to determine if another network transmission is being received, and in the absence of detecting such transmission will commence transmitting after its own randomly generated delay interval.

By coincidence for the system arrangement of FIG. 1, no other transceiver can reliably communicate with more than one of the innermost tier formed by T11, T14 and T24. Therefore after T11's delay interval, T21 will receive the message; after T14's delay, T12 will receive the message; and after T24's delay, T22, T25 and T34 should receive the message. Assuming that there are no collisions, then this process will be continued as the message is relayed, after various delay intervals, radially outward. However, there is significant risk that T22 will be the victim of collision between transmissions from T24 (innermost tier) and T12 (next tier outward) because as drawn neither T24 nor T12 can reliably hear the other. If either T12 or T24 begins transmitting before the other has completed the message, the microprocessor of T22 will determine, through error coding, that corrupted data have been received. T22 will continue to wait for a clean message, and may receive such either from T25 or from T26. Because transmission from T26 would be a fourth tier retransmission, while that from T25 is second tier, likely of collision between them is greatly reduced.

Because the locations of the room lighting controls C11–C35 are often determined primarily for reasons other than RF communication with other transceivers, such as convenient access by people entering or within the room, or historic accident of building wiring, network topography having some of the collision problems, due to differing numbers of links along somewhat parallel paths, will be common. One solution is to provide preferred routing, by increasing the delay for some nodes or providing other logical restrictions that reduce the likelihood of collision. The control programs resident in the microprocessors of the individual transceiver/control combinations can be made more or less responsive to reprogramming by the building computer, to overcome parallel path problems. For example, transceiver T12 could be commanded not to relay any received messages; T13 would then communicate via T26 and T22. Upon communication via that route becoming unreliable, T26 could be disabled temporarily, and T12 enabled for relaying through command from the building computer.

Installation

A feature of the invention is the low cost of installation and set-up. Because a transceiver (including any associated microprocessor) is self-contained and requires no electronic adjustments, it is easily installed by an electrician without special training. The only connections required are input power, and control connections to the control unit. Where justified economically, either the control unit or the transceiver can be a plug-in unit to the other, or they can be integrated. The only extra requirement is that a serial number, bar code number, or other number related to an address or identifying number stored in the transceiver (usually by the manufacturer) be recorded on installation sheets or building drawings for each location.

A preferred embodiment involves a set-up routine which forms part of the application program. It can be fully performed automatically without human intervention unless the result found is that one or more transceivers, on the list of those which were installed, cannot be contacted.

In this method of network set-up, the building computer 40 initiates transmissions of packets directed to those control points (first tier nodes) which can communicate directly with the transceiver associated with the building computer; and then transmits similar packets directed one at a time through each of the first tier nodes to those control points which can communicate with the first tier nodes (therefore called second tier nodes); and so on until at least one communication path has been identified to each of the control points. From this information the building computer calculates routing or retransmission data for each of the control points.

Using the node logic of FIG. 5 and the packet format of FIG. 6c, to start the computer will command transmission of an "all network" address packet having a kill level of 0. This packet will be received by transceivers T11, T14 and T24, these being the only ones within communications range. Each of these will not retransmit the packet because the kill level variable is 0, and will transmit an acknowledgement. Upon receiving these acknowledgements, the applications program will identify these three nodes as first tier, for creation of a network communications diagram like that of FIG. 1.

As a next round, one at a time the computer will direct a packet to the first tier nodes just identified, containing special command or data blocks which cause the addressed node to transmit an "all-network" packet with a kill level variable of zero. Upon receiving acknowledgement signals, these will be retransmitted to transceiver T41, so that the computer can identify the linkages from that first tier node similarly, this method can systematically contact every transceiver that is operably linked, so that the communications linkage diagram of FIG. 1 is created by the computer.

If, as an example, there is at this time no relay transceiver T26, and the link from T13 to T23 is too unreliable, then an error message will be generated under control of the application program, that there is no communication with T23. From study of the building diagram of FIG. 2 (which can also be created in the computer, based on installation drawing data which have been entered) building personnel can determine that the problem is due to the isolation of transceiver T23, not a transceiver failure. The addition of relay T26 then becomes an obvious correction.

These data can be used in different ways, depending on the mode of routing selected for use in this network. For example, if normal mode transmission is by flooding, with transmission of a code signal indicative of the number of times a packet is to be retransmitted, the building computer then stores a number associated with each control point address, where that number equals the number of retransmissions which were required to reach the control point via the shortest route; or a greater number if the system operator determines that this will reduce the instances in which packets do not get through following the first transmission from the building computer's transceiver. This method is especially economical if each control point has a unique serial number or bar code (as many as 48 or 50 bits may be used), which can be written onto a building map when the units are installed throughout the building; and which can be used as an initial address when the control point acknowledges receipt of a packet. Subsequently it will often be desirable for the building computer to assign addresses which can be far shorter, for use in routine addressing of packets.

These techniques make it possible to display a 3-D image of the building on a screen, so that for future control purposes a human operator can select control points for lighting optimization according to their location with respect to outside factors such as sun exposure, or groups which are aligned along a wall or floor, without resort to complex lists and drawings.

If route information is normally to be transmitted along with the address in each packet (FIG. 6a), then the building computer stores the shortest route determined for each control point, for transmission if that control point is to be addressed. If address tables for retransmission are stored in each control point, then the computer creates such tables from the route information which was obtained, and subsequently transmits the respective table contents to each control point.

It will also be clear that, with this invention, other automatic set-up techniques are possible under application program control.

Alternatively, a portable computer can be carried through the building to communicate one at a time directly with each of the control points, and determine which other control points this point can send a packet directly to and receive an acknowledgement signal from.

Transceiver/control unit combination

Figure 7:
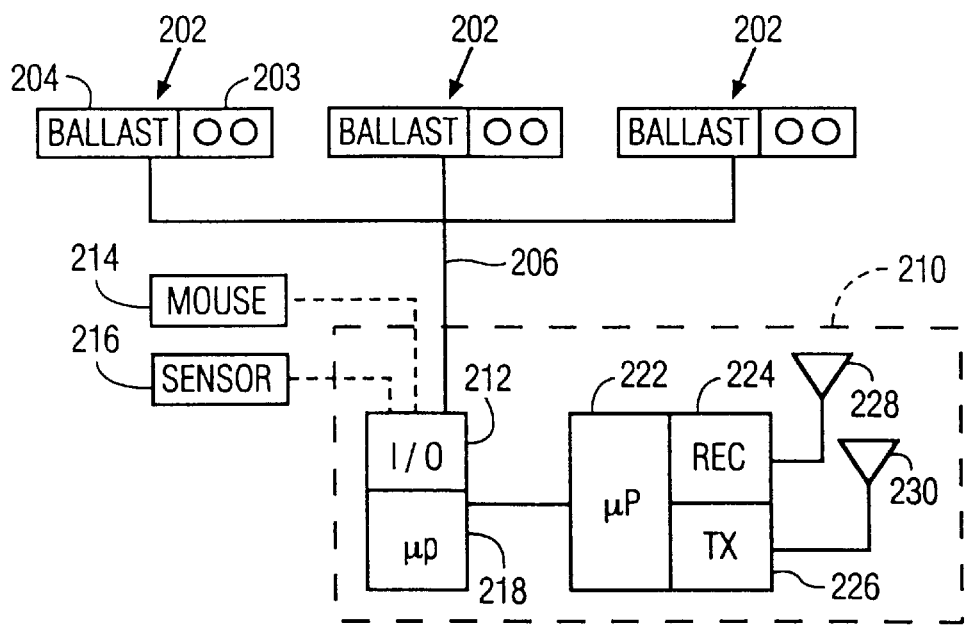
FIG. 7 is a block diagram of the lighting control system in a room of the building of FIG. 2.

It is desirable that the control unit be either a standard unit, or one which is simply modified for easier connection to the associated transceiver. The arrangement shown in FIG. 7 is a preferred arrangement for controlling lights with a room or area having common lighting needs. The room is shown as having 3 luminaires 202 each having one or more fluorescent tubes 203 and a remotely controllable ballast 204. In this embodiment the ballasts are controlled via signals which propagate over the supply conductors from a wall unit 210. The wall unit 210 includes an I/O (input/output) circuit 212 which provides the AC power to the luminaires, and also provides in-room communication and control functions. For example, this room includes a "mouse" 214 which communicates with the I/O circuit by an infra-red link and an occupancy sensor 216 which also communicates with the I/O circuit by another infra-red link. The mouse 214 and the sensor 216 provide control signals which are forwarded to a microprocessor 218 which stores lighting control data or signals, and controls the I/O circuit so that the lights are operated at the times and brightnesses desired (e.g., mouse 214 control) or permitted by the building computer.

Connected to the microprocessor 218 is another microprocessor 222 which is directly associated with the transceiver formed by receiver section 224 and transmitter section 226.

This embodiment shows separate microprocessors 218 for room control and 222 for network communication, and separate antennae 228 and 230 for the receiver and transmitter. However, there is no reason that economy or technical developments may not dictate combining the microprocessors, and the antennae, into one each.

As will be discussed below, the receiver and transmitter sections operate independently of each other, except that the communication protocol preferred for the invention requires that transmission and reception be mutually exclusive. In the preferred embodiment, the frequency of transmission over antenna 230 is independent of the carrier frequency most recently received over antenna 228.

Sliding Frequency

Interference from other signal sources is always a potential problem with radio communications. People in unrelated industries are considering use of bands between 900 and 950 MHz because of commercial development of transceivers for operation in these bands, because of the propagation characteristics of these bands, and because of the possibility of unlicensed operation at low power. As a result it is necessary to devise equipment or techniques which, while inexpensive, will provide sufficiently reliable data transmission for the building system being controlled in the face of unexpected interference.

Applicants believe that, in most cases, interference will come from signal sources which are also narrow band sources. By using frequency-shift-keying modulation, with a frequency shift of ±4 kHz transmission and a 20 Kbit/sec data rate, transmission according to the invention is also a narrow band source. If successive packet transmissions from the transceiver T41 are at different frequencies within the band, then it is unlikely that all will be victims of excessive interference. One technique is to have a preplanned frequency hopping scheme, such as is used for military security, but this requires not only storage of the hopping algorithm or sequence, but also tight synchronization of the network transceivers to a master clock.

Figure 8:
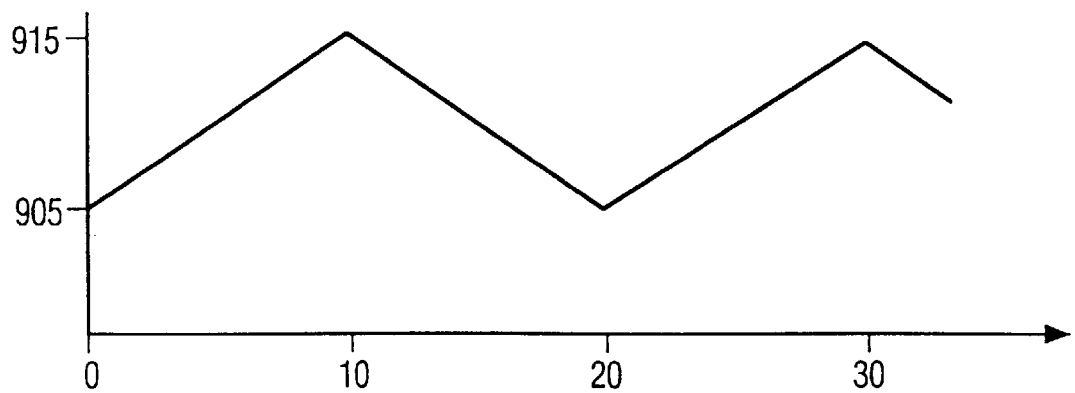
FIG. 8 is a time diagram showing transmitter frequency sliding.
Figure 9:
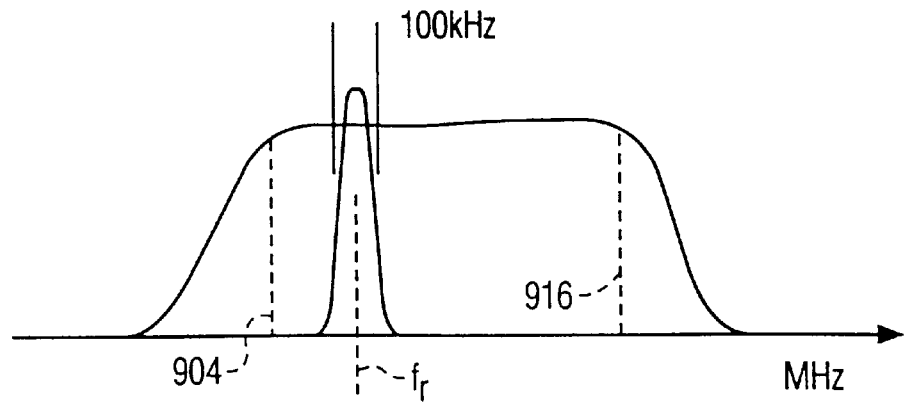
FIG. 9 is diagram showing receiver lock-on, FIGS. 10a and 10b are block diagrams of the transmitter and receiver portions of a transceiver according to the invention, with simple sliding frequency.

According to another aspect of the invention successive transmissions are at carrier frequencies which are shifted by a frequency greater than the bandwidth of the transmitted signal, with a simple smooth variation of the carrier frequency or a stepwise monotonic variation across the selected bandwidth. FIG. 8 shows a preferred triangular waveform variation in which, between one transmission and a next approximately 1.5 sec later, the carrier frequency has shifted 1.5 MHz. This is readily performed by the transmitter 226, shown in slightly greater detail in FIG. 10a than in FIG. 7, in which a VCO 302 receives a sweep input from a frequency sweep control, and binary data input preferably at 20 Kbits/sec. The rate of sweep is selected to keep the carrier frequency change, during one transmission burst, within the receiver bandwidth, but also to maximize the chance that an interference signal which excessively degrades reception of this burst will not affect the next transmission.

The VCO therefor will have a slowly varying frequency when transmitting a carrier burst at the beginning of a packet, and will alternate up and down 4 kHz from the present carrier frequency when being modulated. This signal is amplified in power amplifier 304 and fed through antenna coupler 306 to antenna 230.

This causes the shift during one packet transmission (20 msec duration including a preamble burst) to be less than 20 kHz, well within the 50 kHz preferred bandwidth of the receivers 224 of nodes within communication range, and their AFC circuitry.

If, to reduce costs or to allow a simple sliding frequency, a phase locked loop is not used in the transceiver sections then temperature variations will cause variations of typically 10 PPM/°C. in the VCO frequency. At 900 MHz this amounts only to 900 kHz variation for 100° C. variation between very cold building and cold unit, and hot building with high ambient within the control unit. If aging has an equal effect, temperature and aging effects in the transmitter section will cause up to approximately ±1 MHz variation. To stay within a 10 to 12 MHz pass band of receiver sections, the transmitter range chosen is nominally from 905 to 915 MHz. The additional variation due to temperature and aging will, however, be essentially constant during the triangle period of 20 seconds, so that the slope of frequency change will not exceed approximately 1.0 Mhz per sec.

In order to simplify network control problems, it is desirable that the network operate asynchronously, both as to timing of packet transmission but also as to oscillator frequencies. Thus, not only will the transceiver T41 associated with the building computer have a free-running triangular wave control of its transmission frequency, with a period of approximately 20 sec for one full wave cycle, but so also will all other transceivers in the network. Each transmitter will be turned on only when transmission is commanded, and requests for transmission can be made at arbitrary times, so that the exact frequency being transmitted will be unpredictable. The result of this protocol is that the receiver section 224 of each transceiver has no way to predict the frequency of the next data signal to be received, and must be able to search and lock on to a transmission before the first data bit of that transmission.

To permit operation in this mode, each receiver has two operating modes: a capture mode, and a tracking mode. In the capture mode the receiver has a pass band of approximately 10 to 12 MHz, from approximately 904 to 916 MHz. As previously described, a packet commences with an unmodulated carrier burst lasting a sufficient period of time to allow the carrier to be detected, and for the receiver to lock on to that signal and track it in the tracking mode. This is a function of the receiver scanning rate, and the detection and evaluation time. To keep circuitry costs and processing time down, an unmodulated burst of at least 1 msec is desirable, and preferably approximately 12 msec.

In the tracking mode the receiver should have a narrow bandwidth, but no narrower than 100 kHz. This effectively blocks interfering noise or signals outside the narrow pass band, but passes the FSK signal fully. The receiver will incorporate an AFC circuit which is operable to control the local oscillator in the tracking mode, so that the small variation in carrier frequency, if linear sliding is used, can be followed.

Figure 10A:
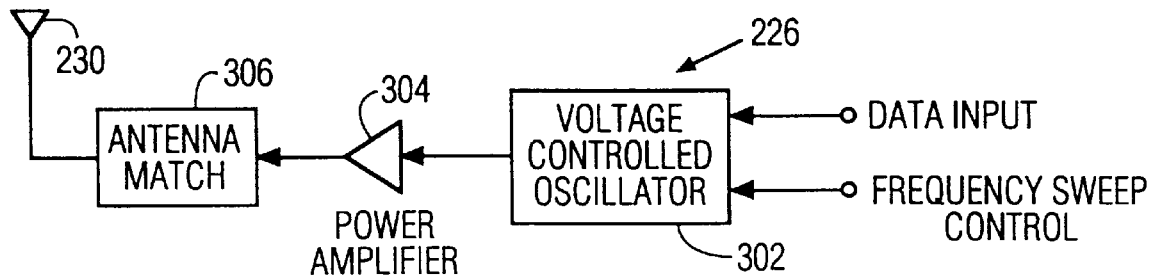
Figure 10B:
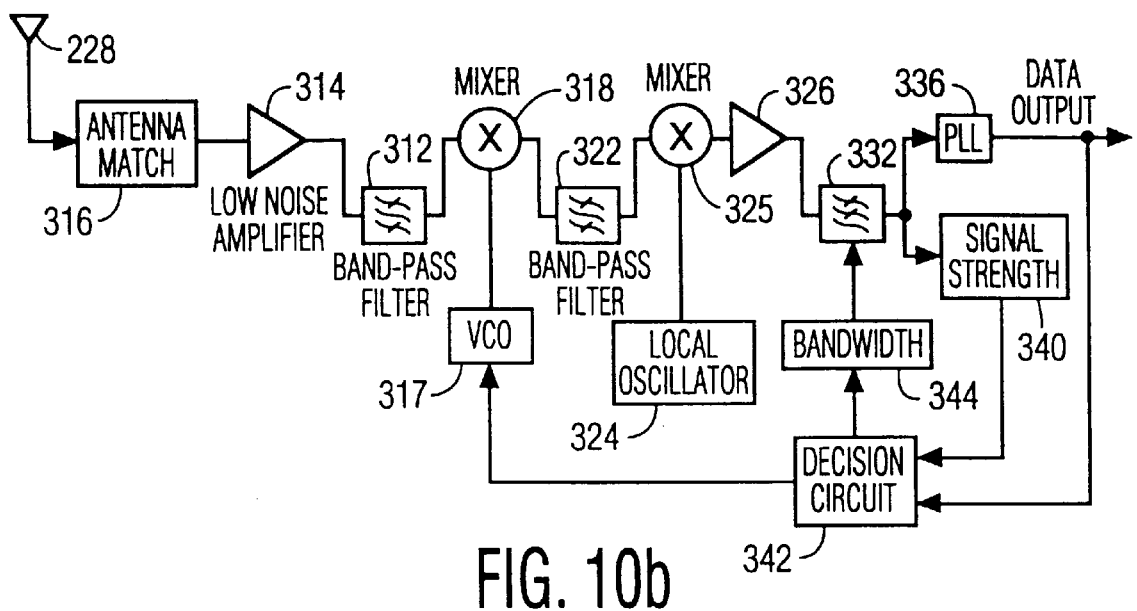

A first embodiment of the receiver section 224 according to the invention, shown by the schematic block diagram in FIG. 10b, includes three sections: one broad band for the capture mode defined by band-pass filter 312, and one narrow band for the tracking mode, defined by IF filter 322, and low pass filter 332. The signal from the antenna 228 is matched to the amplifier 314 by a coupler 316. The output of a VCO 317 is mixed with the output of filter 312 in mixer 318, to provide a first IF signal. This is then mixed with the output of local oscillator 324 in mixer 325 to provide a second IF signal which is amplified in amplifier 326 and filtered in second IF lowpass filter 332. A simple detector 336 provides the detected binary signal from the FSK signal output from filter 332.

To identify the existence of an in-band signal while in the capture mode, a received signal strength indicator 340 also receives the output of filter 332. The output of the received signal strength indicator 340 is provided to a decision circuit 342. The decision circuit has one output which controls the VCO 317, to cause the VCO to stop at the frequency which provides a maximum output from indicator 340. In this embodiment the bandwidth of the lowpass filter 332 is also varied by a bandwidth controller 344, which receives a second output from the decision circuit 342. The filter 332 may be set for a relatively wide bandwidth during capture, and a narrow bandwidth during tracking so that the signal to noise ratio can be improved. The decision circuit 342 also receives the output of the data detector 336 so that it can determine if the signal being received is a network signal, or is an interfering signal. As soon as it is determined that a received signal is interference, sweeping of the VCO is resumed to search for network signals.

To improve the receiver's ability to discriminate against interference signals at a nearby carrier frequency, it is preferable to operate the receiver with a relatively narrow bandwidth at all times. In that circumstance the bandwidth controller 344 is omitted.

In an alternative embodiment a tunable narrow bandpass filter is swept across the band such as 912 to 924 MHZ, to a point at which the signal is received. At that point sweeping is stopped, and the signal is detected.

Avoiding Interfering Signals

Although at the time this invention has been made, there is relatively little traffic in the 900 MHz ISM band, systems according to this invention must be capable of operating without significant modification or maintenance for many years. As a result it should be probable that, despite interference by other signals, and without need for modification, adjustment or reprogramming, the transceivers will actually receive network signals which have been transmitted. Interference can be caused by signals present in one part of the building, but not others; and the interference can be specific signals which are frequently or always present on one channel, or signals occurring sporadically or randomly.

When a transceiver locks on to a signal, and assuming that this occurs during the unmodulated or preamble portion of a transmission, the signal can be identified as a network signal either by the preamble, if any, or by t he subsequent modulation and digital information being according to the communication protocol used by the network; for example, the modulation type and bit rate matching one of the examples described in this application, or another one selected for the system. This validation of the signal will probably require between 2 and 5 msec. If, however, the receiver and its microprocessor can more quickly detect the presence of a different modulation, then this received signal can be more quickly identified as spurious, and the transceiver will resume searching for a different signal sooner. By including an additional detector which can detect the presence of "wrong" modulation, skipping can commence in less than one millisecond. This slight increase in cost and complexity of the receiver reduces the chance of missing the beginning of a valid network transmission.

A further technique for interference avoidance, which may be preferred when a plurality of interfering signals are being detected within the band of interest, is prediction. If the receiver oscillators are not highly stable and accurately calibrated, the carrier frequency of an interfering signal cannot be identified accurately so that, as a specific frequency, it is skipped during the next scan of the band. However, it not necessary that the frequency itself be known. If tunable filters or VCO's in the receiver are swept across the band by a source which is stably repetitive, the time from beginning of the sweep to the frequency corresponding to the interfering signal is easily measured and stored. An "interference frequency" table in the microprocessor then store s a plurality of times which have been identified, on recent sweeps, as corresponding to interfering signals. For the next given number of sweeps the detector output is blanked while the oscillator or filter is passing these frequencies, so that only network signals or new interference signals are detected.

To further improve probability of detection of network signals by a "smart" receiver, in the presence of a number of interfering signals, the technique just described can be enhanced by checking each of the stored times, after a certain number of sweeps, which number may be related to the number of entries in the interference frequency table. Each time that interference is verified as still present at a frequency, the time interval until this frequency is again checked is increased, up to some maximum.

The receiver frequency correlation described above can also be used to allow transmission on one frequency while already receiving another, if desired. According to the preferred operating protocol, a transceiver will not transmit while it is receiving a network signal in the band. As a practical matter, while the transmitter section is transmitting, the receiver section may receive an overpowering signal such that only the center frequency of the strong signal can be determined. However, if the receiver section has sufficient selectivity to receive and demodulate a network signal while the transmitter section is transmitting, then a variation in the control protocol may increase total packet throughput more than it increases collisions. To accomplish this, the transceiver's controlling microprocessor must determine that this transmitter would now transmit on a frequency sufficiently different from that being received, to avoid collision at any other transceiver which is also receiving the same packet as this transceiver. Otherwise it is preferable to delay transmitting from this transceiver while a packet is being received. Such a determination can made without need for accurately calibrated receiver and transmitter sections, while still adhering to a preferred mode in which the transmitter frequency is varied, if an approximate relationship can be determined between (a) the frequency with which this transmitter section would transmit at this time and (b) the frequency that the receiver section is now receiving.

With a transceiver as shown in FIG. 10, this relationship is determined by causing the receiver to track the transmitter frequency while it is transmitting, as described above. For example, the microprocessor correlates the times in the receiver frequency sweep while so tracking, with the times or voltages in the transmitter's triangular or other varying control circuit which are then causing this frequency of transmission, and stores these correlations. When a network signal has been detected and is being received, the microprocessor compares the transmitter control value now being generated, with the value which corresponds to the receiver sweep time for this reception, and determines if the approximate frequency that would now be transmitted is well separated from the network frequency now being received.

PLL Transmitters

The systems described above need not be operated with a linearly sliding frequency, if interference can be otherwise avoided. For example, all transmitters can operate at one frequency, and each receiver can be tuned for that one frequency. This eliminates the possibility of missing a transmission because a receiver's scanning is interrupted while it evaluates signals which turn out to be interference; and it enables the length of a preamble or synchronizing period to be greatly reduced before transmission of the first data bit begins. Intra-system interference due to collisions at individual receivers can be minimized by the use of variable delays between receipt of a packet and re-transmission.

It is also possible to optimize system operation for use with a plurality of predetermined frequencies, so that the overall bandwidth or sweeping range of the receivers can be reduced; or each receiver can be arranged or programmed to scan only all or a selected group of those predetermined frequencies. To operate at a predetermined frequency, or scan on certain predetermined frequencies, typical practice is to use a phase locked loop to stabilize the frequency of a VCO against a reference source, using selected division ratios for the selected frequencies.

The loop settling time is one of the important parameters to be determined when designing a PLL. If different frequencies are to be generated at different times, then rapid settling is usually desired so that the transmitted frequency is substantially constant at the new value shortly after the change in frequency has been commanded. In telecommunication systems using PLL transmitters with FSK modulation, the data modulation rate is usually so high that the time period of the longest allowable series of same value bits is small compared with the response time of the PLL. Therefore the modulation does not affect the center frequency which is being defined by the PLL. However, the system described in this application uses a low bit rate, and may transmit signals having a series of same value bits which is longer than the settling time. In this situation, the transmitter phase locked loop causes the loop control voltage applied to the VCO to change—that is, the carrier frequency drifts from the selected value. This drift causes corruption of the data detected by the receiver, because in the receiver its first oscillator is locked at a frequency which differs from the selected value by exactly the first IF frequency.

In a packet data transmission system according to this aspect of the invention, the transmitter phase locked loop is broken (opened) just before send in the preamble; that is, after the preamble, and just before or at the instant that modulation begins. Although the transmitter is "drifting" during the data modulation period, this time is short enough that actual drift should be inconsequential. As soon as the data burst has been transmitted, and the transmitter's output amplifier has been turned off, the loop is closed again, so that the oscillator is again stabilized at the selected (or at the next selected) frequency.

Figure 11A:
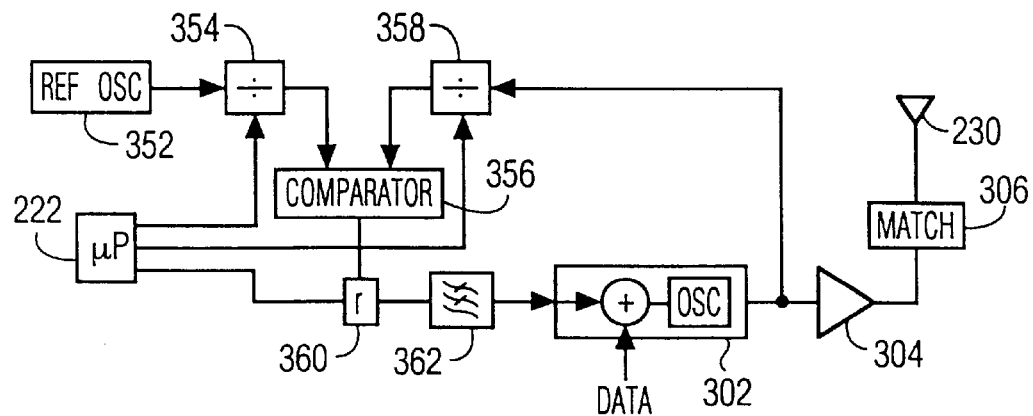
FIGS. 11a and 11b are block diagrams of the transmitter and receiver portions of a second transceiver according to the invention, having a breakable transmitter phase locked loop.

The transmitter shown in FIG. 11a includes components which may be identical to those described with respect to FIG. 10a. The reference portion of the PLL includes a reference oscillator 352 whose output is received by a controllable reference divider 354 whose output in turn is one of two inputs to a phase comparator 356. The output of the VCO 302 is received by a controllable main divider 358 whose output in turn is the other input to the phase comparator 356. The output of the comparator 356 is passed through a switch 360 to a loop filter 362 which may have a settling time of approximately 2 to 3 msec. The loop filter is designed so that, in the absence of a signal input to the filter, its output will remain substantially constant for a time period equal to the longest data burst to be transmitted. The output of the loop filter 362 is one of two inputs to a summer 364 in the VCO, which also receives the binary data signal to be transmitted. The VCO output is amplified in power amplifier 304, and provided to antenna 230.

The reference divider 354, divider 358 and switch 360 are controlled by signals from the transceiver microprocessor, such as the processor 222 shown in FIG. 7. Changing the divider ratios allows selection of different predetermined frequencies. The switch 360 is preferably opened by the microprocessor just before the first data bit to be transmitted, and closed immediately after completion of the data packet. It will be clear that opening of the switch 360 can be delayed slightly, so long as the change in the control voltage from the loop filter 362 produces an oscillator change which is small compared with the frequency deviation used in the FSK transmission.

Figure 11B:
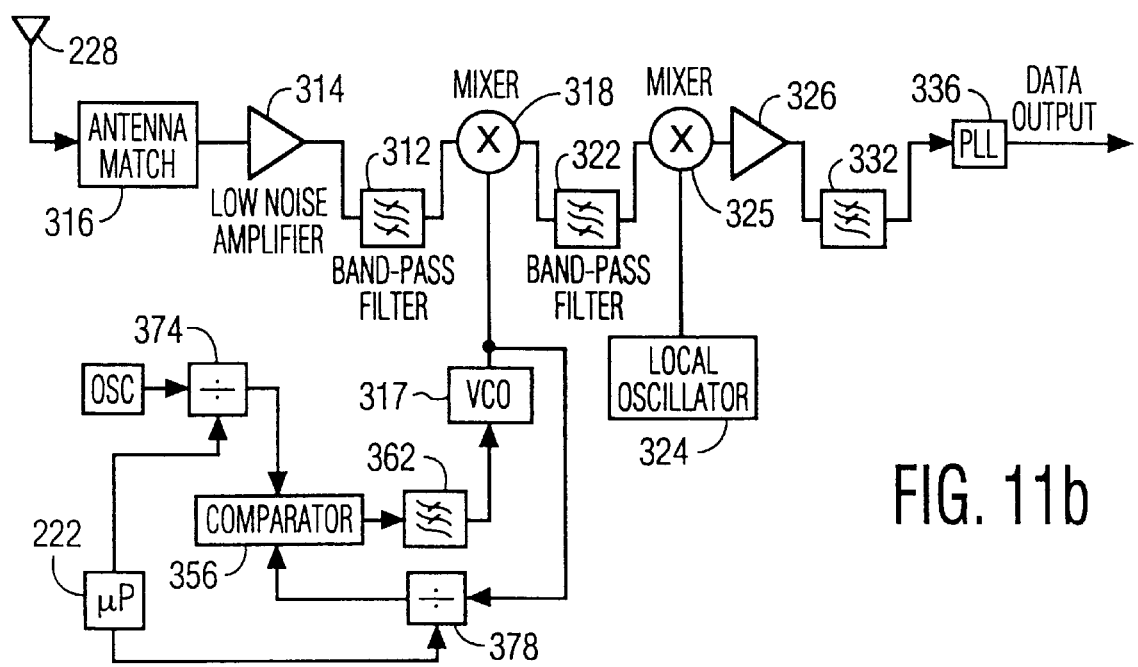

The receiver portion shown in FIG. 11b has a similar PLL control of the VCO 317, through controllable reference divider 374 and main divider 378, which are also controlled by the microprocessor 222, and a comparator 356. The loop filter 362 may be identical to that used in the transmitter portion. Optionally, it may also be economical to use one set of PLL circuits both for transmission and reception, although the VCO frequency will be set differently to provide the IF frequency offset.

If each transmitter transmits only at an assigned frequency, the adjustable dividers in the transmitter PLL can be simpler, fixed dividers; and if the whole system uses one frequency, the receiver dividers likewise need not be adjustable. However, there still may be economy is using one set of PLL circuits for both transmission and reception, in which case the dividers must be adjustable to permit shifting frequency by the amount of the first intermediate frequency.

Other Variations

Many other uses and variations of the invention will suggest themselves to those of ordinary skill. For example, by making the packets larger, they can be used for transmitting much larger bursts of information, such as audio.

The invention is not limited to low bit rate modulation, nor to FSK. These are desirable for a particular lighting control application, but other modulation techniques or rates may be preferred choices for other applications, especially any requiring a higher data transfer rate.

It is not necessary that acknowledgement packets be processed in the same way as outgoing packets. For example, regardless of the format for outgoing packets, it may be desirable to minimize multiple transmission of them. To accomplish this, according to this variation an acknowledgement packet should contain a code identifying it as an acknowledgement, as well as the address of the acknowledging node. Each node is programmed to store the address of the next node along the route to the building computer. Only the acknowledgement code and that "next node" address need be added, when transmitting an acknowledgement of receipt for this node. When received at the "next node" the address will be identified as valid. Because this is an acknowledgement, this "next node" will substitute its stored address for sending acknowledgements, and retransmit. This continues until the building computer is reached.

This technique suffers the disadvantage that some reprogramming is required if one of the links becomes sufficiently unreliable, even though parallel links were available.

Especially after an "all-network" packet has been sent, it is desirable that there not be such a large number of collisions that many acknowledgement signals are lost. Assuming a transmission duration of 10 msec, and a total of 400 control units in a building, it would require 4 seconds for the building computer's transceiver to receive all the acknowledgements if they arrived in a perfectly concatenated string. Thus it may be desirable that, after an "all network" packet is received, each transceiver apply a longer than usual random delay before attempting sending an acknowledgement signal or retransmitting one received from another node. Similarly, the building computer should delay far longer than usual before sending any individually addressed packets to combinations from which an acknowledgement packet has not been received.

If the "building" actually consists of two structures which are spaced sufficiently far apart that direct radio communication from at least one node in one to at least one node in the other is unreliable, then a single building computer can control both by providing a data line from the computer to a transceiver in the remote building. The problem of interfering packets can probably be minimized, however, by considering the two structures as one network. It may even be most economical to link them by placing a relay transceiver on the exterior of one of the buildings, or both, similar to the way that the relay T26 is used in the embodiment of FIGS. 1 and 2.

Many other formats or protocols can be used to avoid effects of interference. There is no requirement for frequency sweeping if one or more channels are available for substantially exclusive use of this network; in that case, all transceivers can operate on a same channel if the transmitter stabilities are adequate. However, this will create the disadvantage of increased collisions. With frequency sweeping by each transceiver, independent of the others, the possibility of collision at a receiver is greatly reduced. Any particular receiver section which has locked on to a first transmission will not usually be affected if another node, within reception distance, commences transmitting on a frequency which is outside the narrow pass band to which the particular receiver has locked.

If interference calls for use of an interference-adaptive receiver as described above, a further improvement in system performance may be attainable if it can be determined that the receiver sections in one region of the building are all experiencing interference at approximately the same one or more periods in their frequency sweep. If, in addition to the normal control signal packets and acknowledgement packets, transceivers can be directed to transmit long term interference patterns to the building computer such that any patterns affecting multiple transceivers can be identified, at some increase in operational and communication complexity the transmitter sections in that region can be directed not to transmit when their frequency sweep is passing that approximate frequency. The usefulness of this technique will be dependent partly on the stability of the transmitter frequency/time sweep relationship over a period of minutes.

In addition to the control functions described, the system is applicable to many situations where the building computer can control many devices which are affected by the same environmental factor or building control decision. For example, remotely controlled sun blinds are effective in some regions, to reduce heating or air conditioning costs. The control units for these blinds can easily be included in the network, at a lower cost than providing a local sensor and stand-alone control system. This is especially true where the operation of one system or set of devices should be taken into account when making control decisions for another system, such as artificial lighting.

Artificial lighting has been described with respect to conventional fluorescent tube luminaries with dimming ballasts. Of course, the invention is not so limited. As dimming techniques may be developed for other light sources, these can equally well be controlled through a network according to the invention.

What is claimed is:

1. A method of transmitting packets of data over a distributed radio communications system comprising a plurality of transmitters and a plurality of receivers, comprising:

transmitting respective radio signals carrying respective ones of said packets of data from respective ones of said plurality of transmitters, each of said respective ones of said plurality of transmitters transmitting at a respective power level sufficient to be received reliably at least one of the receivers, at a respective carrier frequency within a given frequency band, and scanning said given band by each of said receivers, to detect a transmission within said band having a signal strength at the respective receiver sufficient for detection, characterized by the step, in each of the transmitters independently of the other transmitters, of changing to a different carrier frequency within said given band before transmitting a respective next packet of data, each of said transmitters changing to differing carrier frequencies asynchronously with respect to the other transmitters, such that successive packets of data received at a given one of said receivers will be transmitted at carrier frequencies, within said band, which are random with respect to each other.

2. A method as claimed in claim 1, wherein each of said transmitters is associated with a respective one of the receivers to form a respective transceiver, characterized in that, after receiving a respective packet of data which is to be retransmitted, each transceiver retransmits the respective packet of data at a carrier frequency, within said band, which is independent of the carrier frequency at which the respective packet of data was received.

3. A method as claimed in claim 1, characterized in that each transmitter changes its carrier frequency linearly with respect to time.

4. A method as claimed in claim 3, characterized in that the change of carrier frequency continues during transmission of a packet of data.

5. A method as claimed in claim 4, characterized in that said given band is approximately 10 Mhz wide and is between approximately 900 and 950 MHz, and the carrier frequency changes at a rate of approximately 1 Mhz per second.

6. A transmitter for transmitting packets of data, comprising:

a transmitting section for transmitting radio signals at a carrier frequency, and carrier frequency control means for varying the carrier frequency linearly as a function of time over a given band of frequencies, characterized in that said carrier frequency control means changes the carrier frequency continuously during transmission of a packet of data, and said carrier frequency control means is free from stabilization with respect to temperature or aging.

7. A transceiver for transmitting and receiving packets of data, comprising:

a transmitting section for transmitting radio signals at a carrier frequency, carrier frequency control means for varying the carrier frequency over a given band of frequencies, means, responsive to receipt of a packet which should be retransmitted, for delaying for a randomly determined period of time, and then testing to determine if a further radio signal in said band is being received, and means for retransmitting said packet only after determination that no radio signal is being received in said band, said carrier frequency control means controlling the carrier frequency dependent solely on the duration of time since the last transmission by said transceiver, wherein the carrier frequency control means changes to a different carrier frequency within said given band after transmission of each packet of data, and responsive to receipt by said receiver section of a packet of data which is to be retransmitted, the transmitter section retransmits the packet at a carrier frequency which is independent of the carrier frequency over which the packet was received.

8. A transceiver as claimed in claim 7, characterized in that the carrier frequency control means varies the carrier frequency linearly over said given band.

9. A transceiver as claimed in claim 7, characterized in that said carrier frequency control means changes the carrier frequency continuously during transmission of a packet of data.

10. A transceiver as claimed in claim 7, characterized in that said carrier frequency control means is free from stabilization with respect to temperature or aging.

11. A transceiver as claimed in claim 7, comprising a microprocessor for evaluating a received data packet to determine if it should be retransmitted, and for controlling retransmission.

12. A transceiver as claimed in claim 7, characterized in that the transceiver transmits at a power less than 1 watt within a band between 900 and 950 MHz.

13. A transceiver as claimed in claim 12, characterized in that the transmitter frequency is varied linearly over a band approximately 10 Mhz wide, and said receiver section scans a frequency band greater than 10 Mhz wide to accommodate unstabilized transmitter frequency shifts.

14. A transceiver as claimed in claim 7, characterized in that the transmitter section transmits a data-free burst for a given period of time prior to transmission of a packet of data, and said receiver section has a scanning rate sufficient to scan said given band within said period of time.

* * * * *